United States Patent [19]

Micheron

[11] 4,163,162

[45] Jul. 31, 1979

[54] BISTABLE ELECTRET SYSTEM

[75] Inventor: François Micheron, Paris, France

[73] Assignee: Thomson-CSF, Paris, France

[21] Appl. No.: 865,330

[22] Filed: Dec. 28, 1977

[30] Foreign Application Priority Data

Jan. 4, 1977 [FR] France .............................. 77 00075

[51] Int. Cl.$^2$ .............................................. H01G 7/02
[52] U.S. Cl. ................................. 307/400; 307/142; 340/783; 200/181
[58] Field of Search ................... 307/88 ET, 112, 142, 307/143; 365/146; 200/181; 340/324 R, 324 M, 336, 764, 783, 811; 361/233

[56] References Cited

U.S. PATENT DOCUMENTS

| 3,617,806 | 11/1971 | Lillevang | 361/233 |
| 3,896,274 | 7/1975 | Fraim et al. | 307/88 ET |
| 4,065,677 | 12/1977 | Micheron et al. | 200/181 |
| 4,078,183 | 3/1978 | Lewiner | 200/181 |

OTHER PUBLICATIONS

Proceedings of the West Virginia Academy of Science, vol. 40, pp. 338–344.

*Primary Examiner*—James W. Moffitt
*Attorney, Agent, or Firm*—Cushman, Darby & Cushman

[57] ABSTRACT

The invention relates to bistable systems using electrets. The invention provides a three-electrode system in which the movement of the moving armature is obtained by means of biasing voltages applied to the fixed electrodes. A switching voltage applied between the moving electrode and one of the fixed electrodes releases the electrostatic holding forces generated by the electrets.

15 Claims, 10 Drawing Figures

BISTABLE ELECTRET SYSTEM

This invention relates to bistable systems comprising two fixed electrodes between which a moving armature may occupy two rest positions. These rest positions are secured by means of electrostatic holding forces generated by the presence of one or more charged dielectric layers known as electrets. To make the armature rotate from one of its rest positions to the other, an electrical control voltage is applied between the electrodes. The electrical fields required for rotating the armature are directly associated with the electrical charge densities contained in the electrets. Accordingly, the voltages required for rotation increase with the size of the systems and it frequently happens that the electrical control by semi-conductor circuits becomes incompatible.

In order to obviate this drawback, the invention provides a bistable system using electrets and wherein a low switching voltage is sufficient to release the rotation of the moving armature, the rotation of the armature being primarily effected under the influence of another voltage suitably applied to the electrodes.

In accordance with the present invention, there is provided a bistable electret system comprising a pair of fixed electrodes forming a capacitor, a moving armature arranged between said fixed electrodes for occupying two rest positions respectively close to each of said fixed electrodes, at least one intermediate electrode integral with said moving armature, electrical biasing means connected to said electrodes for creating switching forces enabling said moving armature to move from one of said rest positions to the other and vice-versa, layers of electret material arranged in the gap of said capacitor for creating electrostatic holding forces preventing said moving armature from leaving one of said rest positions under the sole action of said switching forces, and electrical control means connected to said intermediate electrode for releasing said electrostatic holding forces.

For a better understanding of the present invention and to show how the same may be carried into effect, reference will be made to the following description in conjunction with the accompanying drawings, among which:

In the following description, the bistable electret systems are particularly intended for the storage and display of data in binary numerical form. Nevertheless, the invention also extends to bistable electret systems which comprise means for switching an electric current or for the all-or-nothing modulation of a flow of fluid or any type of radiation.

Figure 1:
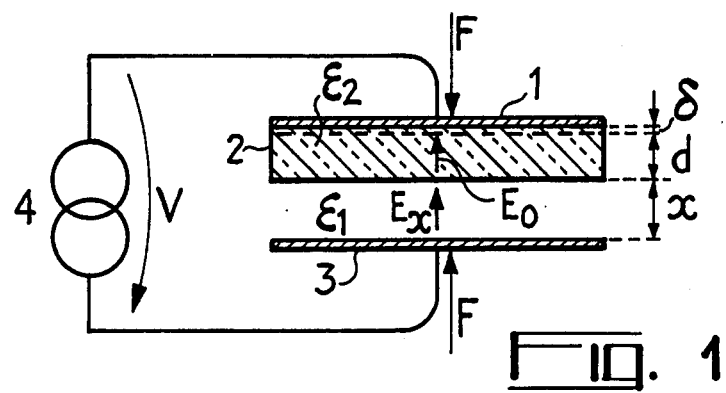
FIGS. 1 and 2 are explanatory figures.
Figure 2:
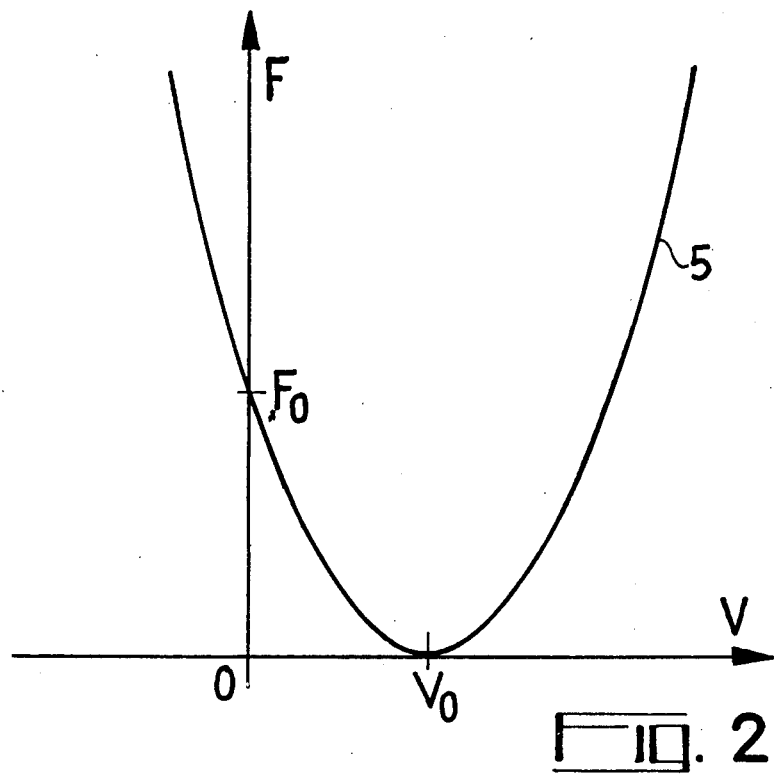

In order more clearly to illustrate the mode of operation of the invention, FIG. 1 shows an electrical capacitor of which the electrodes 1 and 3 enclose a layer of air of permittivity $\epsilon_1$ and thickness x and a dielectric layer 2 of permittivity $\epsilon_2$ and thickness $d+\delta$. This dielectric layer 2 is an electret comprising, for example at the distance $\delta$ from the upper surface, a layer of quasi-permanent negative electrical charge. It has been assumed in FIG. 1 that the electret layer 2 adheres by its upper surface to the electrode 1 and that an electrical voltage generator 4 feeds the electrodes 1 and 3 so as to create electrical fields $E_x$ and $E_o$ in the presence of negative charges and the voltage V. By virtue of the electrostatic attraction, closing forces F tend to eliminate the interval x. For each value of the voltage V, there exists a value of the force F which is maximal when the electret layer 2 is in contact with the electrode 3. The curve 5 in FIG. 2 illustrates the law of variation of the holding force F when the voltage V varies. The holding force F disappears for a particular value $V_o$ of the voltage applied. Although this particular value $V_o$ may be experimentally determined, it can be approximately calculated by the following formula:

$$V_o = \frac{d - \delta}{\epsilon_o \epsilon_2} \sigma$$

where $\sigma$ is the surface charge density carried by the electret 2 and $\epsilon_o$ is the permittivity of vacuum.

For example, where $d=20$ μm, $\sigma=1$ μm, $\epsilon_o \epsilon_2 = 2 \cdot 10^{-11}$ farad/meter, $\sigma=10^{-9}$ C/cm², $V_o$ is approximately 9.5 volts.

Figure 3:
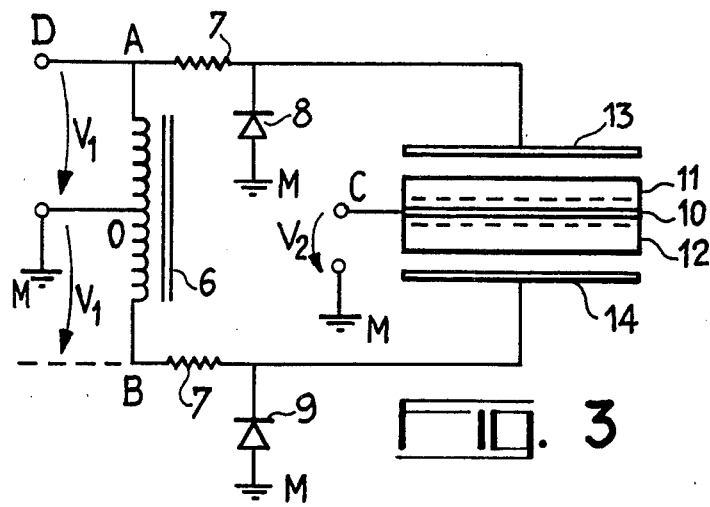
FIG. 3 shows a first example of embodiment of a bistable electret system according to the invention.

FIG. 3 shows a first example of embodiment of a bistable electret system according to the invention. It comprises two fixed electrodes forming a planar capacitor and a moving armature consisting of an intermediate electrode 10 carrying on each of its surfaces negatively monocharged electret layers 11 and 12. The fixed electrodes 13 and 14 are connected to electrical biassing means comprising an autotransformer 6 with a centre tap O fed between M and D by an alternating voltage $V_1$. Accordingly, this voltage $V_1$ exists between M and A and appears in phase opposition between M and B. A half wave rectifier circuit comprising, for example, the resistor 7 and the diode 8 is connected to A. Accordingly, only the positive half waves of the voltage $V_1$ are transmitted to the fixed electrode 13, as shown at (a) in FIG. 4 where $V_{13}$ is the voltage applied to the electrode 13. Similarly, a half wave rectifier circuit 7, 9 feeds the fixed electrode 14 with the voltage $V_{14}$ shown at (b) in FIG. 4. The voltages $V_{13}$ and $V_{14}$ are measured in relation to earth M. If the intermediate electrode 10 is connected to earth M by its terminal C, the moving armature 10, 11, 12 applies itself to one of the fixed electrodes 13 and 14. In the absence of voltage $V_2$ between the terminals M and C, the voltages $V_{13}$ and $V_{14}$ are unable to rotate the moving armature 10, 11, 12 because the electrostatic holding forces oppose them. Referring to the abscissa t shown at (d) in FIG. 4, it may be assumed that, before the instant $t_1$, the moving armature 10, 11, 12 is held on the electrode 14. Between the instants $t_1$ and $t_3$, provided that no control voltage $V_2$ is applied, the half wave voltage is unable to attract the moving armature towards the fixed electrode 13 because a holding force Fo prevails, as shown by the diagram in FIG.

2. This arises out of the fact that the voltage $V_{14}$ is substantially zero between the instants $t_1$ and $t_3$. In addition, the amplitude of $V_{13}$ is selected in such a way that the holding force Fo is not overcome. In the final analysis, the moving armature remains permanently in the lower rest position.

Figure 4:
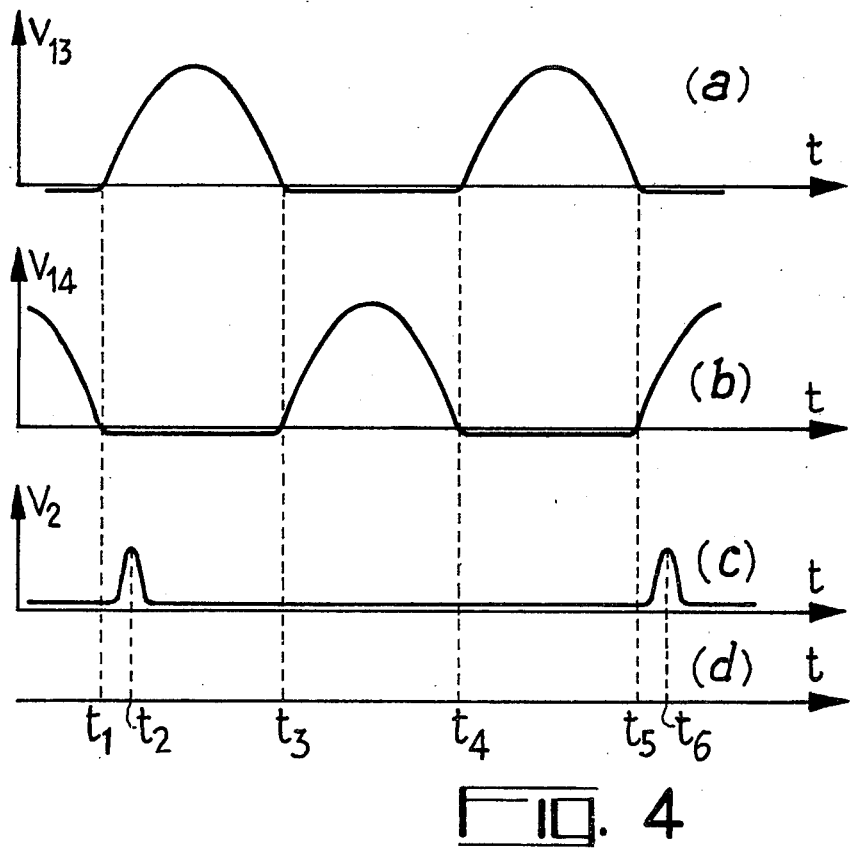
FIG. 4 illustrates the operation of the system shown in FIG. 3.

In order to make the moving armature 10, 11, 12 rotate into the upper rest position, i.e. applied to the fixed electrode 13, a control voltage $V_2$ has to be applied between C and M. For example, as shown in FIG. 4 at (c), a voltage pulse $V_2$ having the amplitude $V_o$ of the diagram of FIG. 2 was applied between C and M at the instant $t_2$. As a result, the electrostatic holding force is eliminated which enables the armature 10, 11, 12 to rotate upwards under the action of the accelerating voltage $V_{13}$. At the instants $t_4$ and $t_5$, the moving armature remains in its upper position because no half wave of the voltage $V_{14}$ is able to bring it downwards again. By contrast, at $t_6$, a new control pulse $V_2$ enables the electrostatic holding force to be eliminated and the moving armature 10, 11, 12 returns to its lower position under the action of the voltage $V_{14}$.

The mode of operation of the bistable electret system according to the invention may be summarized by noting that the biassing voltages $V_{13}$ and $V_{14}$ applied to the fixed electrodes are intended to produce the movement of the moving armature, but that this movement can only effectively take place on condition that the electrostatic holding force has been cancelled by applying the control voltage $V_2$.

The wave forms shown in FIG. 4, like the circuits of FIG. 3, are given by way of non-limiting example. The voltages $V_{13}$ and $V_{14}$ need not be sinusoidal half waves. The resistances 7 and the diodes 8 may be interchanged to obtain positive pulses $V_{13}$ and $V_{14}$ which do not overlap as a function of time.

Figure 5:
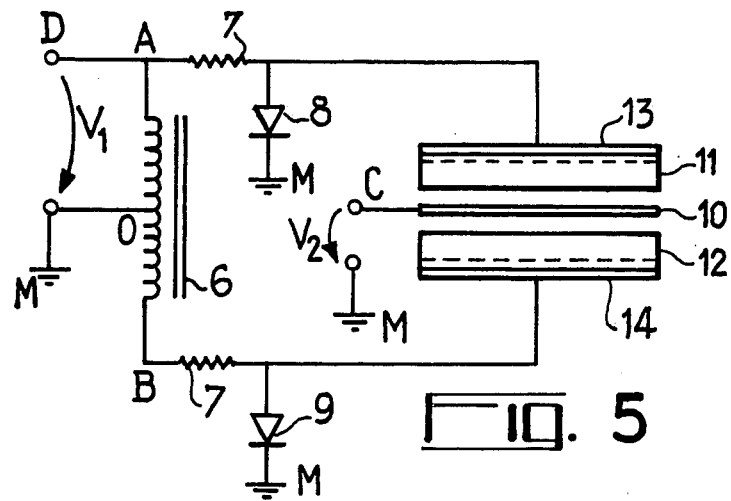
FIG. 5 shows a first variant of the bistable electret system according to the invention.

FIG. 5 shows a variant of the bistable electret system which operates in a fashion similar to that of FIG. 3. The moving armature is simply formed by the intermediate electrode 10. The electret layers 11 and 12 are integral with the fixed electrodes 13 and 14. It can be seen that the arrangement of the diodes 8 and 9 is reversed because, in this case, the half waves transmitted are negative.

Figure 6:
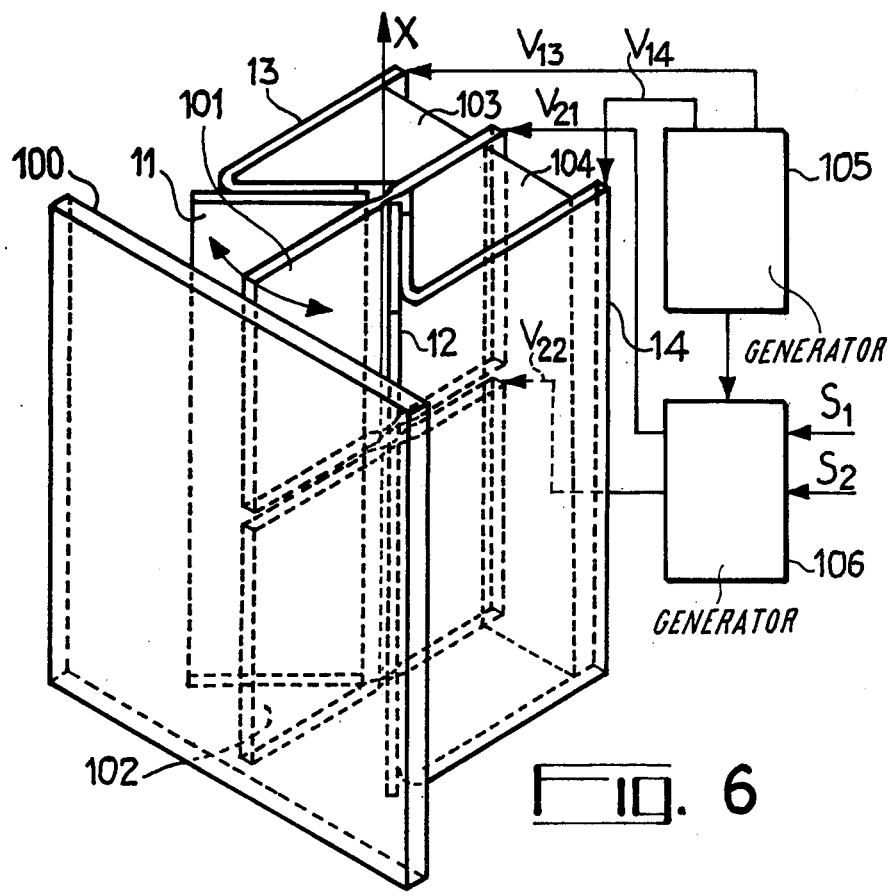
FIG. 6 shows a second variant of the bistable electret system according to the invention.

FIG. 6 is an isometric view of two bistable electret systems which are particularly intended for the display of binary numerical data. The systems previously described have the structure of planar capacitors. In the case of FIG. 6, the structure is that of a capacitor of which the electrodes 13 and 14 are arranged along the faces of a dihedron of edge X. Electret layers 11 and 12 cover the electrodes 13 and 14 and two conductive flaps 101 and 102 form the intermediate electrodes of two superposed systems. The pivoting of the flaps 101 and 102 is formed by a reduction in thickness along the edge X so as to form a hinge which enables the flaps to pivot, as indicated by the double curved arrow. A transparent window 100 protects the bistable systems against dust. Pieces 103 and 104 of an insulating material hold the flaps 101 and 102 and support the fixed electrodes 13, 14 and the electrodes 11 and 12. A pulse generator generating electrical pulses which do not overlap as a function of time biases the electrodes 13 and 14 in exactly the same way as in FIG. 5. A generator 106 supplies control voltages $V_{21}$ and $V_{22}$ in response to the signals $S_1$ and $S_2$. For use as display cells, the appearances of the fixed electrodes and the opposite surfaces of the flaps 101 and 102 are optically distinguished. For example, the surfaces of the flaps 101 and 102 may be respectively painted black and white. By using the same coverings for the electrodes fixed opposite one another and by selecting transparent electrets, it can be seen that the dihedron appears completely white in one of the rest positions, whereas it will be completely black in the other rest position.

The data presentation unit shown in FIG. 6 may display two bits of information in the form of black or white squares. This arrangement operates by reflection and may readily be generally used as a checker-board comprising numerous lines and columns of display elements. It will be noted that the generator 105 is common to all the elements. On completion of a rotation cycle, there is no need to continue supplying the biasing voltages. The generator 106 is synchronized by the generator 105 so as to establish the concordance of the voltages $V_{13}$, $V_{14}$, $V_{21}$, $V_{22}$ required for the rotation of the flaps 101 and 102. It is pointed out that the voltages $V_{13}$ and $V_{14}$ may be high without any disadvantage to the control of rotation. It is therefore possible to provide a large dihedral angle for bistable systems of considerable size. It is also pointed out that the voltage $V_o$ which eliminates the electrostatic holding force is made as low as possible by adopting for the electrets 11 and 12 an electrical charge density which varies inversely to the pivoting radius.

In order to obtain high flexibility and a long service life, the flaps 101 and 102 may with advantage be made from a sheet of metallized thermoplastic material. Local heating along the edge X of the dihedron, followed by drawing, enables a highly flexible and particularly durable hinge to be obtained. The electrodes 13 and 14 may be formed by suitable metallization of the elements 103 and 104.

The system shown in FIG. 6 may be slightly modified by mechanically joining the flaps 101 and 102. In this case, the moving armature is provided with two coplanar intermediate electrodes and, to enable it to stop being held by the electrostatic holding forces, control voltages $V_{21}$ and $V_{22}$ have to be simultaneously applied to the two intermediate electrodes. This version of the bistable electret system with two control electrodes is particularly advantageous for forming matrix groups because p line wires and q column wires are sufficient for controlling an assembly of p X q bistable elements. Naturally the invention is by no means limited to two control electrodes. Systems operating by coincidence with an order higher than two may also be envisioned.

Before concluding the description of FIG. 6, it is pointed out that the voltages $V_{13}$ and $V_{14}$ are selected in dependence upon the required switching speed and upon the linear dimensions of the system.

For example, a dihedral system with an opening angle of 60° of which the linear dimensions are of the order of one centimeter may be fed by a biasing generator operating on the alternating current with line frequency of 50 c/s. The voltages $V_{13}$ and $V_{14}$ are of the order of a few hundred volts. It should be noted that, outside the switching phases, no voltage need be applied to the bistable electret system.

The release technique is particularly useful in the case of bistable electret systems using electrodes arranged in the form of a dihedron with a large opening angle.

Figure 7:
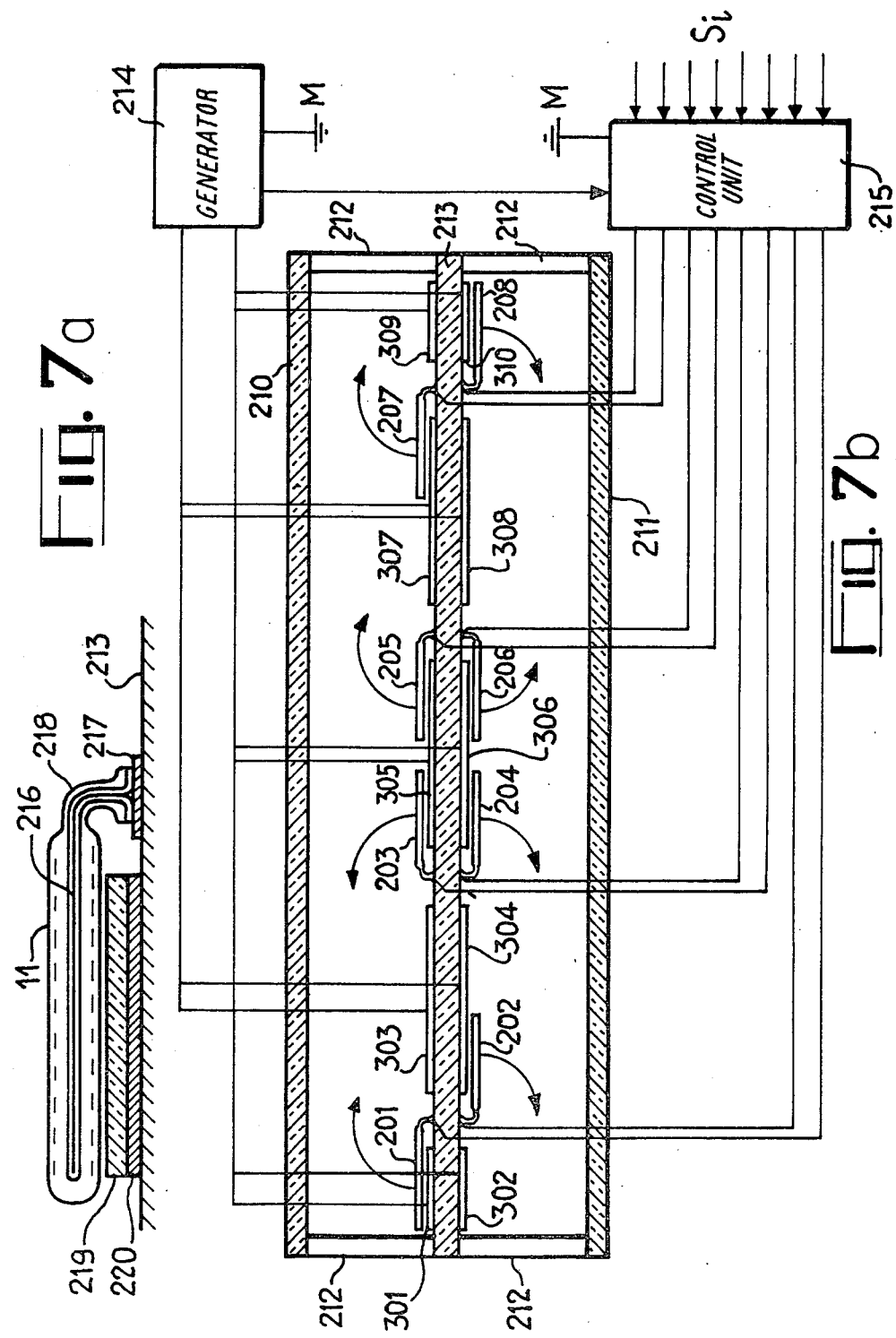
FIG. 7(b) shows a panel adapted for the double-sided display of descriptive elements.
FIG. 7(a) shows a detail of the panel illustrated in FIG. 7(b).

FIG. 7(b) shows a two-sided display panel of which the bistable electret cells are arranged in the form of a dihedron with an opening angle of 180°. The display panel is constructed around an insulating support 213.

Figure 8:
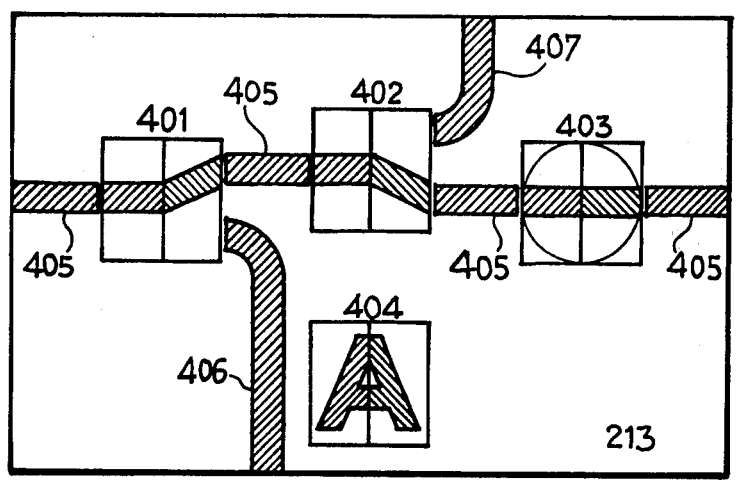
FIG. 8 illustrates a synoptic panel comprising bistable electret cells.

Transparent windows 210 and 211 afford protection against dust and are connected to the support 213 by lateral walls 212. Fixed electrodes 301, 302, 303, 304, 305, 306, 307, 308, 309 and 310 define four bistable electret cells on each surface of the support 213. The fixed electrodes are fed by the electrical biasing means 214. Moving flaps 201, 202, 203, 204, 205, 206, 207 and 208 are fixed to the support 213. They have two rest positions and their rotation consists in a pivoting movement through 180° indicated by the curved arrows. Each moving flap is provided with electrets in an arrangement which is illustrated in FIG. 7(a). The flap is formed by a sheet of negatively charged polypropylene 11 metallised on one surface 216. The sheet 11 is folded and anchored to the support 213 by means of an opening-out of its metallised surface 216 which comes into contact with the electrode 217. A constricted zone 218 acts as pivot; it is obtained by cold drawing. The fixed electrode 220 rests on the support 213 and may be provided with a dielectric layer 219 serving to reduce the electrostatic force holding the flap in its rest position. Each moving flap is electrically connected to electrical means 215 which control the rotation of the flaps under the action of input signals $S_i$. The operation of the panel shown in FIG. 7(b) is substantially the same as that of the system shown in FIG. 3. Each of the moving flaps of the panel shown in FIG. 7(b) rests through one of its surfaces on one of said fixed electrodes which make it move under the influence of the voltages supplied by the generator 214. Each cell has alternately to show two different appearances which are obtained by an impression applied to the front and rear surfaces of the moving flaps and to the fixed zones alternately covered and uncovered by them. To this end, it is possible to adopt uniform areas of different shades or colours. It is also possible to use graphic symbols, as shown by the synoptic panel 213 in FIG. 8. This panel comprises portions of fixed diagrams 405, 406 and 407 and several bistable electret cells for displaying descriptive modifications made to the diagram. The cells 401 and 402 are capable of representing the two possible appearances of a bifurcation. The cell 403 symbolises an open circuit breaker and the cell 404 supplies a complementary indication relating to the branch 406.

Figure 9:
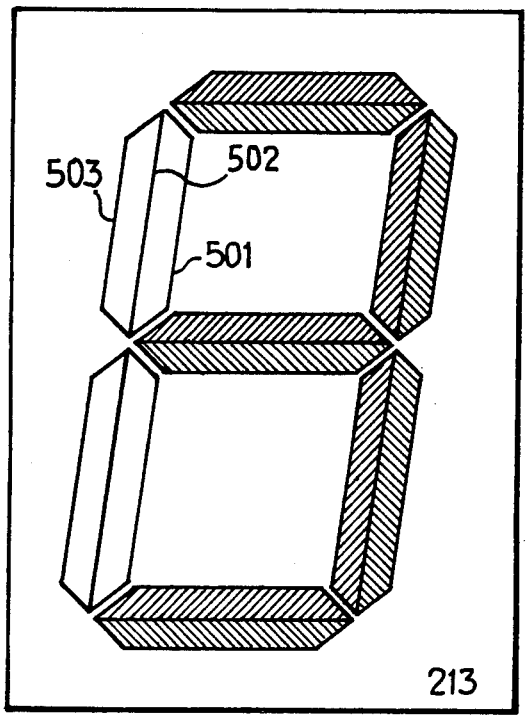
FIG. 9 illustrates a segmented display panel composed of bistable electret cells.

Another way of envisaging the display of characters by means of bistable electret systems is shown in FIG. 9. FIG. 9 shows a bar display in which each bar is formed by a bistable electret system of the dihedral type. The dihedron surfaces 503 and 501 receive markings which can distinguish between two appearances, for example black and white. The dihedron edge 502 serves as pivoting line for a moving flap rotating inside the dihedron 501, 503.

What I claim is:

1. Bistable electret system comprising a pair of fixed electrodes forming a capacitor, a moving armature arranged between said fixed electrodes for occupying two rest positions respectively close to each of said fixed electrodes, at least one intermediate electrode integral with said moving armature, electrical biasing means connected to said electrodes for creating switching forces enabling said moving armature to move from one of said rest positions to the other and vice-versa, layers of electret material arranged in the gap of said capacitor for creating electrostatic holding forces preventing said moving armature from leaving one of said rest positions under the sole action of said switching forces, and electrical control means connected to said intermediate electrode for releasing said electrostatic holding forces.

2. System as claimed in claim 1, wherein said electrical biasing means supply voltage waveforms having alternations which do not overlap in time; said electrical control means delivering pulses emitted in synchronism with said alternations to make said moving armature to shift from one of said rest positions to the other.

3. System as claimed in claim 1, wherein said intermediate electrode is divided into several parts respectively fed by voltage pulses which, acting in coincidence, release said electrostatic holding force for enabling said moving armature to rotate.

4. System as claimed in claim 1, wherein said fixed electrodes carry said layers of electret material.

5. System as claimed in claim 1, wherein the two surfaces of said intermediate electrode carry said layers of electret material.

6. System as claimed in claim 1, wherein said capacitor is a planar capacitor.

7. System as claimed in claim 1, wherein said rest positions respectively create two differentiated descriptive patterns readable by reflection.

8. System as claimed in claim 1, wherein said electrical biasing means comprise: a line frequency voltage inlet, an autotransformer with a centre tap and half wave rectifier circuits; said centre tap being connected to ground along with one of the terminals belonging to said electrical control means; said autotransformer being fed from said inlet; said half wave rectifier circuits being fed from the two end terminals of said autotransformer.

9. System as claimed in claim 1, comprising an assembly of bistable electret cells arranged in the form of a panel; the fixed electrodes of each of said cells being connected in parallel with the terminals of said electrical biasing means; the intermediate electrodes of said cells being separately connected to said electrical control means.

10. System as claimed in claim 9, wherein said assembly of cells materializes a character display panel.

11. System as claimed in claim 9, wherein said cells are disposed on the two major faces of said panel.

12. System as claimed in claim 10, wherein said display panel is of the segment type.

13. A system as claimed in claim 1, wherein said capacitor assumes the form of a dihedron; said moving armature being formed by a flap hinged along the edge of said dihedron.

14. System as claimed in claim 13, wherein the angular opening of said dihedron is equal to 180°.

15. System as claimed in claim 13, wherein the charge density carried by said electret layers varies inversely to the pivoting radius of said flap.

* * * * *